(12) United States Patent
Kasai et al.

(10) Patent No.: US 7,863,845 B2
(45) Date of Patent: Jan. 4, 2011

(54) ELECTRIC POWER STEERING SYSTEM APPARATUS

(75) Inventors: Eiji Kasai, Toyota (JP); Yoichi Fujinori, Miyoshi-cho (JP); Takatoshi Saito, Toyota (JP); Masaharu Yamashita, Miyoshi-cho (JP); Ippei Yamazaki, Toyota (JP); Shuji Fujita, Miyoshi-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 11/994,560

(22) PCT Filed: May 9, 2006

(86) PCT No.: PCT/JP2006/309617

§ 371 (c)(1),
(2), (4) Date: Jan. 3, 2008

(87) PCT Pub. No.: WO2007/004357

PCT Pub. Date: Jan. 11, 2007

(65) Prior Publication Data

US 2009/0140673 A1    Jun. 4, 2009

(30) Foreign Application Priority Data

Jul. 6, 2005   (JP) ............................. 2005-197053

(51) Int. Cl.
*H02P 1/00* (2006.01)
(52) U.S. Cl. ........................ 318/440; 318/376; 318/139
(58) Field of Classification Search ................ 318/440, 318/376, 139, 800, 727, 778, 448, 801, 140; 180/446
See application file for complete search history.

(56) References Cited

U.S. PATENT DOCUMENTS

2003/0214826 A1   11/2003   Zhu et al.
2006/0214613 A1*   9/2006   Murakami ................... 318/376

FOREIGN PATENT DOCUMENTS

| JP | 7 170610 | 7/1995 |
| JP | 9 20263 | 1/1997 |
| JP | 2000 168605 | 6/2000 |
| JP | 2000 312444 | 11/2000 |

(Continued)

*Primary Examiner*—Karen Masih
(74) *Attorney, Agent, or Firm*—Oblon, Spivak, McClelland, Maier & Neustadt, L.L.P.

(57) ABSTRACT

In a power supply apparatus, a power supply circuit includes a primary power supply circuit including a high-voltage battery and a step-down circuit for stepping down the voltage of the high-voltage battery, and a secondary power supply circuit including a low-voltage battery and a step-up circuit for stepping up the voltage of the low-voltage battery. The primary power supply circuit and the secondary power supply circuit are connected in parallel. An output voltage of the secondary power supply circuit is set to be lower than an output voltage of the primary power supply circuit. When the output voltage of the primary power supply circuit becomes lower than a target voltage of the secondary power supply circuit, the voltage stepped-up by the step-up circuit is supplied to a motor drive circuit. Accordingly, power supply backup of an electric power steering apparatus can be performed at low cost.

20 Claims, 12 Drawing Sheets

FOREIGN PATENT DOCUMENTS

| | | |
|---|---|---|
| JP | 2001-352690 | 12/2001 |
| JP | 2001 352690 | 12/2001 |
| JP | 2003 312517 | 11/2003 |
| JP | 2004 17732 | 1/2004 |
| JP | 2004 166441 | 6/2004 |

* cited by examiner

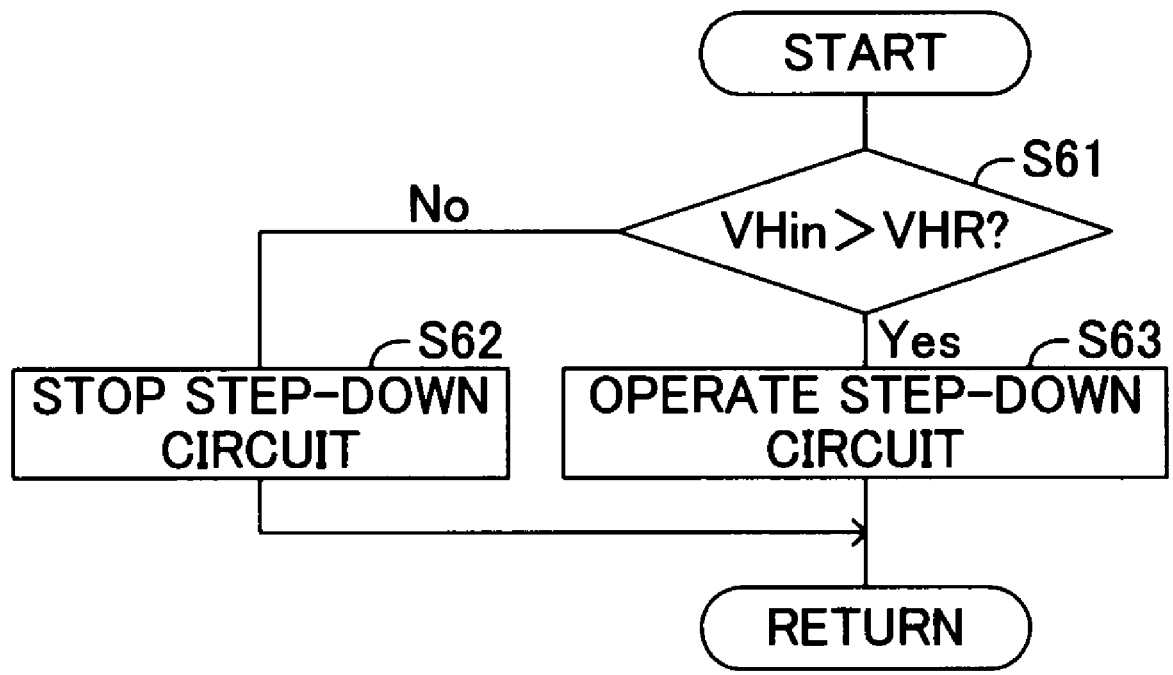

ELECTRIC POWER STEERING SYSTEM APPARATUS

TECHNICAL FIELD

The present invention relates to an electric power steering apparatus which includes an electric motor for applying steering force to steerable wheels in accordance with rotational operation of a steering wheel, and more particularly, to a power supply apparatus of such an electric power steering apparatus.

BACKGROUND ART

A conventional electric power steering apparatus of such a type includes an electric motor for applying steering assist force to rotational operation of a steering wheel, and is designed to adjust the assist force through power supply control which changes the amount of current flowing through the electric motor.

Such an electric power steering apparatus uses a battery as a power source. In consideration of anomaly of a power supply line, an apparatus disclosed in Japanese Patent Application Laid-Open (kokai) No. 2004-17732 includes two batteries; i.e., a main battery and an auxiliary battery, which are of the same voltage. The apparatus is configured such that when an anomaly has occurred in a power supply line connected to one battery, power supplied from the other battery is used through changeover.

However, the conventional apparatus requires a changeover device such as a changeover switch for selectively using power supplied from the two batteries, resulting in an increase in cost. Further, an electric power steering apparatus is required to generate a large drive torque, and therefore, use of a high-voltage-type battery has recently been considered. However, when a system using a high-voltage-type battery as a power source is configured, provision of another high-voltage-type battery as a backup for power failure becomes necessary. Therefore, cost of a power source for an electric power steering increases considerably, which is unfavorable.

DISCLOSURE OF THE INVENTION

The present invention has been accomplished to cope with the above-described problem, and an object of the present invention is to provide, at low cost, a power supply apparatus including a backup power source.

In order to accomplish the above-described object, the present invention provides an electric power steering apparatus including an electric motor supplied with power from a power supply apparatus, and motor control means for controlling operation of the electric motor, wherein the electric motor is operated in accordance with a steering state of a steering wheel so as to apply a steering force to steerable wheels, the electric power steering apparatus being characterized in that the power supply apparatus comprises at least two power supply circuits, including a primary power supply circuit which includes a high-voltage battery for supplying electrical power of a first voltage and a step-down circuit for stepping down the voltage of the high-voltage battery and which supplies the electrical power of the high-voltage battery having a stepped down voltage, and a secondary power supply circuit which includes a low-voltage battery for supplying electrical power of a second voltage lower than the first voltage and a step-up circuit for stepping up the voltage of the low-voltage battery and which supplies the electrical power of the low-voltage battery having a stepped up voltage, wherein the primary power supply circuit and the secondary power supply circuit are connected in parallel, and the stepped up voltage output from the secondary power supply circuit is set to be lower than the stepped down voltage output from the primary power supply circuit.

In the electric power steering apparatus according to the present invention configured as described above, the electric motor can be driven at high voltage, and a low-voltage battery, which is used for general electrical loads, can be used as a backup power source. In addition, the output voltage of the primary power supply circuit is set to be higher than the output voltage of the secondary power supply circuit, which serves as a backup power source. Therefore, in an ordinary state (where the power supply system is normal), high voltage is supplied from the primary power supply circuit to the electric motor, and when the output voltage of the primary power supply circuit becomes lower than the output voltage of the secondary power supply circuit, electrical power is supplied from the secondary power supply circuit. Therefore, provision of a changeover circuit for changeover among a plurality of power supply circuits is not required.

Further, during backup operation, the electrical power from the low-voltage battery is supplied to the electric motor while its voltage is stepped up by the step-up circuit. Therefore, the electric motor can be driven at high voltage, so that a sufficiently large assist force can be attained.

Another feature of the present invention is provision of output-voltage monitor means for monitoring output voltage of the power supply apparatus; and step-up control means, operable when the monitored output voltage is determined to have become lower than a predetermined voltage, for starting step-up operation of the step-up circuit of the secondary power supply circuit.

By virtue of this configuration, the step-up operation is performed only when backup is required, so that the durability of the step-up circuit can be enhanced and power consumption can be reduced accordingly.

Still another feature of the present invention resides in that main regeneration-absorbing means for absorbing regenerative power generated by the electric motor is provided on the output side of the step-down circuit of the primary power supply circuit. By virtue of this configuration, when the electric motor generates regenerative power, the main regeneration-absorbing means absorbs this regenerative power, so that no regenerative current flows through the step-down circuit, and damage to the step-down circuit is prevented.

Still another feature of the present invention is provision of switching means, operable when a voltage of the regenerative power absorbed by the main regeneration-absorbing means exceeds a reference voltage, for closing a power supply line of the secondary power supply circuit so as to cause the regenerative power to flow into the secondary power supply circuit so that the regenerative power is absorbed by the secondary power supply circuit.

By virtue of this configuration, even when the main regeneration-absorbing means fails and becomes unable to absorb regenerative power, that regenerative power can be caused to flow to the secondary power supply circuit, and the step-down circuit of the primary power supply circuit can be protected.

Still another feature of the present invention resides in that the step-up circuit includes a step-up coil provided in series in a secondary power supply line; a first switching element for selectively grounding the step-up coil on a load side; a second switching element functioning as a parasitic diode and provided in series in the secondary power supply line to be located on the load side in relation to a node where the first switching element is connected to the secondary power supply line; switching control means for controlling on-off operations of the first and second switching elements; and voltage monitor means for monitoring the output voltage of the power supply apparatus. The switching control means has a synchronous step-up mode for stepping up the output voltage to a target voltage by turning the second switching element on and off in synchronism with the on-off operation of the first switching element, and an asynchronous step-up mode for stepping up the output voltage to a target voltage by turning the first switching element on and off while maintaining the second switching element in an off state. When the output voltage of the power supply apparatus is equal to or greater than a predetermined voltage, the asynchronous step-up mode is selected. When the output voltage of the power supply apparatus becomes lower than the predetermined voltage, the control mode is switched from the asynchronous step-up mode to the synchronous step-up mode.

By virtue of this configuration, when the output voltage of the power supply apparatus is equal to or greater than the predetermined voltage, the step-up circuit of the secondary power supply circuit is controlled in the asynchronous step-up mode, so that the second switching element is maintained in an off state. Therefore, the output from the primary power supply circuit does not flow into the secondary power supply circuit and is reliably supplied to the electric motor.

When the output voltage of the primary power supply circuit decreases and the output voltage of the power supply apparatus becomes lower than the predetermined voltage, the step-up circuit of the secondary power supply circuit is controlled in the synchronous step-up mode, so that the second switching element is turned on and off in synchronism with the first switching element. Accordingly, the control for stepping up the output voltage to the target voltage is performed well, and a stable stepped up voltage can be obtained. Further, even in a case where the electric motor generates regenerative power, since the second switching element is turned on and off, the regenerative power can be fed from the secondary power supply circuit to the low-voltage battery such that the low-voltage battery absorbs the regenerative power.

Notably, the expression "turning the second switching element on and off in synchronism with the on-off operation of the first switching element" means turning the two switching elements in a mutually related manner, rather than simultaneously turning the first and second elements on and off. For example, there is repeated an operation of turning the second switching element off and the first switching element on so as to supply current to the step-up coil and accumulate electrical power in the step-up coil, and then turning the first switching element off and the second switching element on so as to output the electrical power accumulated in the step-up coil.

Still another feature of the present invention resides in that when a flow of electrical power to the secondary power supply circuit is detected while the step-up control is performed in the synchronous step-up mode, and the flow continues for a predetermined period of time, the control mode is switched from the synchronous step-up mode to the asynchronous step-up mode.

By virtue of this configuration, even in a case where the primary power supply circuit whose output voltage has decreased returns to a normal state and its output voltage exceeds the output voltage of the secondary power supply circuit, after a predetermined time, the control mode is switched to the asynchronous step-up mode so that the second switching element is turned off. Therefore, electrical power does not continuously flow from the primary power supply circuit to the secondary power supply circuit, whereby the batteries and circuits can be protected without fail. Further, since the regenerative power from the electric motor is temporary, the flow of electrical power to the secondary power supply circuit stops within the predetermined time, and the synchronous step-up mode can be maintained.

In this case, the flow of electrical power to the secondary power supply circuit may be estimated on the basis of, for example, the duty ratio of the first switching element. That is, when electrical power flows to the secondary power supply circuit, the output voltage of the power supply apparatus increases. As a result, the step-up operation of the step-up circuit is restrained or stopped, and the duty ratio of the first switching element changes accordingly. Therefore, the flow of electrical power to the secondary power supply circuit can be detected simply on the basis of the duty ratio of the first switching element. Further, the flow of electrical power to the secondary power supply circuit may be estimated in consideration of the duty ratio of the second switching element.

Further, electrical power may be determined to have flowed to the secondary power supply circuit when the monitored output voltage of the power supply apparatus exceeds a predetermined voltage (e.g., a target step-up voltage of the step-up circuit or a set voltage higher than the target step-up voltage by a predetermined voltage).

Still another feature of the present invention is provision of low-voltage-battery voltage detection means for detecting a voltage drop of the low-voltage battery, wherein when the voltage drop of the low-voltage battery is detected, electrical power of the high-voltage battery is charged into the low-voltage battery via the primary power supply circuit.

By virtue of this configuration, charging to the low-voltage battery becomes possible, and a predetermined voltage can be maintained even when the charging system becomes anomalous.

Notably, in this case, in order to prevent breakage of the step-up circuit of the secondary power supply circuit due to overcurrent, a switching element may be provided in the secondary power supply line and controlled such that the on period of this switching element is restricted. In particular, when the second switching element of the step-up circuit is used as that switching element, an increase in cost can be suppressed.

BRIEF DESCRIPTION OF THE DRAWINGS

FIG. 12 is a flowchart showing a step-down circuit control routine.

BEST MODE FOR CARRYING OUT THE INVENTION

Figure 1:
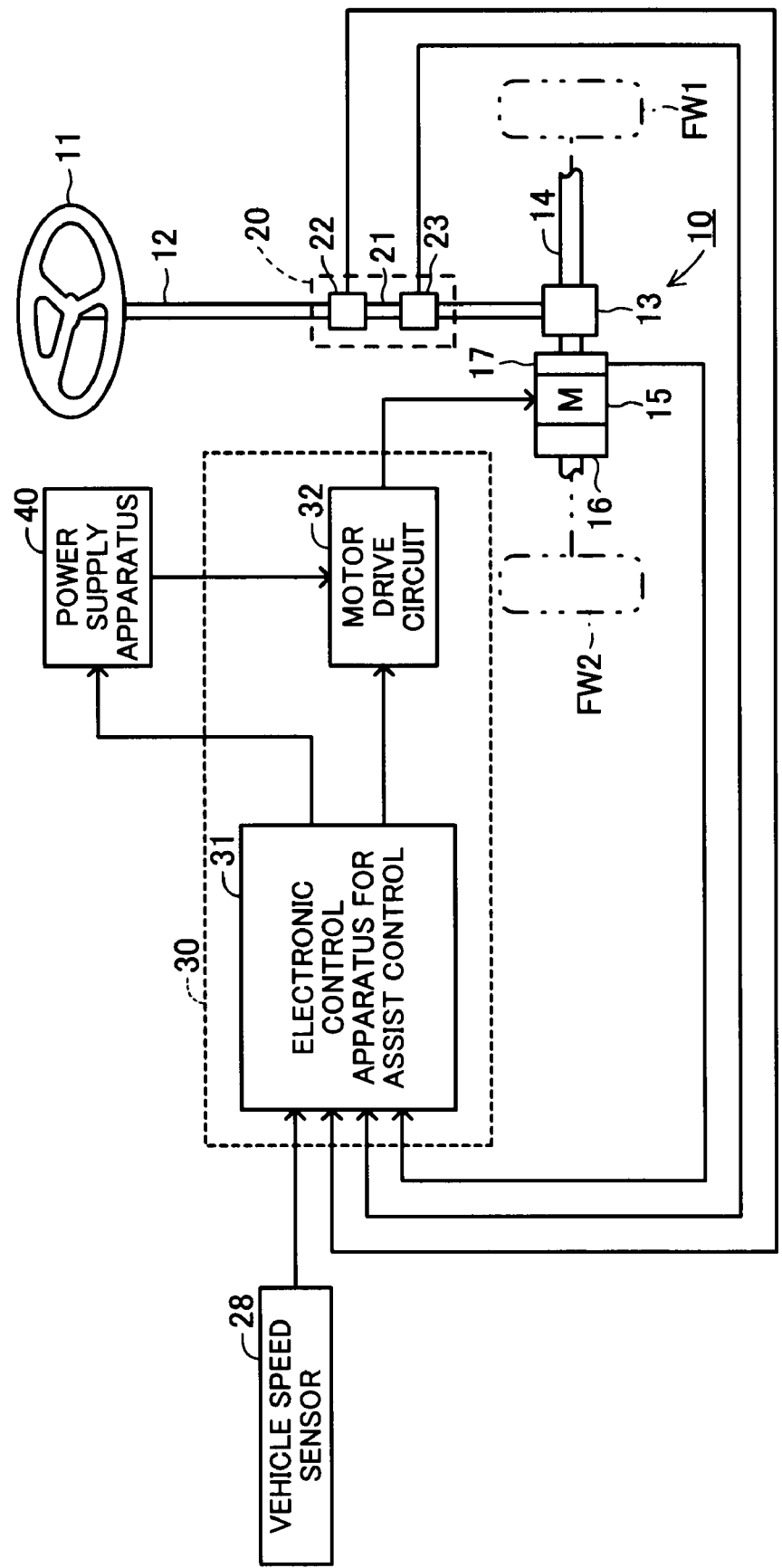
FIG. 1 is a diagram showing the overall configuration of an electric power steering apparatus according to a mode of the present invention.

An electric power steering apparatus according to one mode of the present invention will now be described with reference to the drawings. FIG. 1 schematically shows the electric power steering apparatus according to the mode.

This electric power steering apparatus is mainly composed of a steering assist mechanism 10 for imparting steering assist force to steerable wheels, an assist control apparatus 30 for driving and controlling an electric motor 15 of the steering assist mechanism 10, and a power supply apparatus 40.

The steering assist mechanism 10 converts rotation of a steering shaft 12 about its axis, which is caused by rotational operation of a steering wheel 11, into motion of a rack bar 14 along its axis by means of a rack-and-pinion mechanism 13, whereby left and right front wheels FW1 and FW2 are steered in accordance with the axial motion of the rack bar 14. The electric motor 15 is assembled to the rack bar 14. The electric motor 15 axially drives the rack bar 14 via a ball screw mechanism 16 by means of its rotation, to thereby impart assist force to the rotational operation of the steering wheel 11. A rotational angle sensor 17 is attached to the electric motor 15, and a steering torque sensor 20 is assembled to a lower end portion of the steering shaft 12.

The rotational angle sensor 17, which is composed of a resolver, detects rotational angle of the electric motor 15, and outputs a detection signal indicative of the detected rotational angle. The steering torque sensor 20 is composed of a torsion bar 21 which is interposed in the steering shaft 12 and whose upper and lower end portions are connected to the steering shaft 12, and resolvers 22 and 23 assembled to the upper and lower end portions, respectively, of the torsion bar 21. The resolvers 22 and 23 detect rotational angles of the upper and lower ends, respectively, of the torsion bar 21, and output respective detection signals representing the detected rotational angles.

The assist control apparatus adjusts the amount of electricity supplied to the electric motor 15 on the basis of detection signals from the rotational angle sensor 17, the steering torque sensor 20, and a vehicle speed sensor 28 for detecting speed of the vehicle, to thereby control the assist force. The assist control apparatus is composed of an electronic control apparatus for assist control 31, whose main portion is composed of a microcomputer, and a motor drive circuit 32 for driving the electric motor 15 in accordance with motor control signals from the electronic control apparatus for assist control 31.

In the present embodiment, a three-phase brushless motor is used for the electric motor 15, and an inverter circuit which serves as the motor drive circuit 32 supplies three-phase drive current to the electric motor. However, various motors and drive circuits may be employed; for example, a two-phase brushless motor may be driven and controlled by use of an H-bridge circuit.

Figure 2:
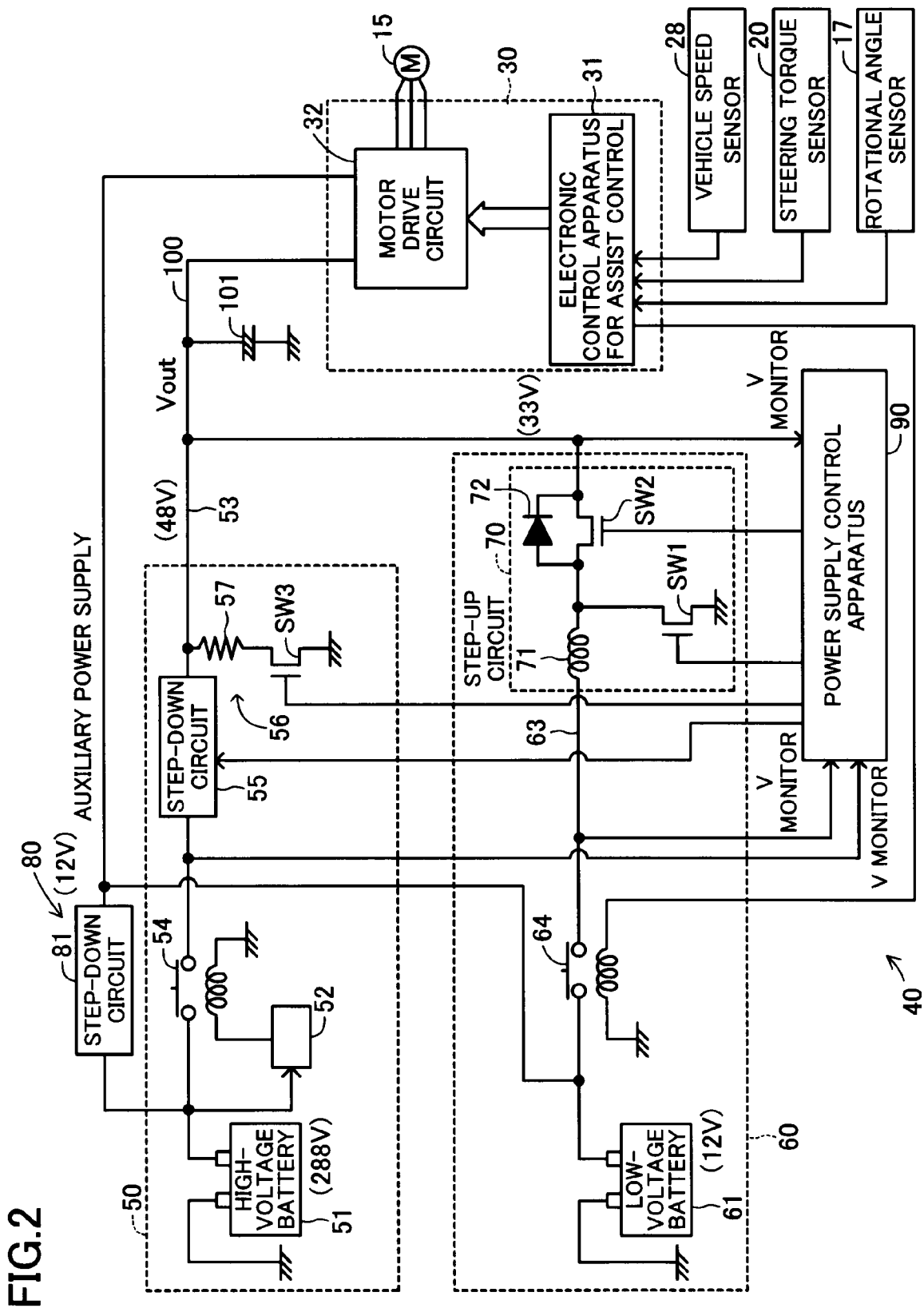
FIG. 2 is a schematic circuit diagram of a power supply apparatus according to the mode.

As shown in FIG. 2, the power supply apparatus 40 is mainly composed of a primary power supply circuit 50, a secondary power supply circuit 60 serving as a backup power supply, an auxiliary secondary power supply circuit 80, and a power supply control apparatus 90.

The primary power supply circuit 50 includes a high-voltage battery 51 which generates a first voltage V1H (in the present embodiment, V1H=288 V); a relay 54 which is caused to open and close a primary power supply line 53 by a power control unit 52; a step-down circuit 55 (DC-DC converter) which steps down the high-voltage battery voltage V1H to a first stepped-down voltage V1L (in the present embodiment, V1L=48 V); and a regeneration-absorbing circuit 56 provided on the secondary side of the step-down circuit 55 and absorbing regenerative power generated at the electric motor 15.

The regeneration-absorbing circuit 56 forms a circuit for grounding the secondary side of the step-down circuit 55 via a resister element 57 and an absorbing switching element SW3 to thereby release regenerative power. This absorbing switching element SW3 is opened and closed by means of a signal from the power supply control apparatus 90.

Meanwhile, the secondary power supply circuit 60 includes a low-voltage battery 61 which generates a second voltage V2L (in the present embodiment, V2L=12 V); a relay 64 which closes a secondary power supply line 63 when assist control is started; and a step-up circuit 70 which steps up the low-voltage battery voltage V2L to a second stepped-up voltage V2H (in the present embodiment, V2H=33 V).

The step-up circuit 70 includes a step-up coil 71 provided in series in the secondary power supply line 63; a first switching element SW1 providing in a grounding line branching from the secondary power supply line 63 on the secondary side of the step-up coil 71; a second switching element SW2 provided in series in the secondary power supply line 63 to be located on the load side (power supply side) in relation to the node where the first switching element SW1 is connected to the secondary power supply line 63; and a diode 72 which short-circuits the input and output ends of the second switching element SW2.

FETs are used for the two switching elements SW1 and SW2. In particular, an FET which functions as a parasitic diode is used for the second switching element SW2. That is, even when the second switching element SW2 is in an off state, the second switching element SW2 allows flow of electricity in the forward direction (power supply direction), although it does not allow flow of electricity in the reverse direction. When the second switching element SW2 is in an on state, the second switching element SW2 allows flow of electricity in both directions.

The diode 72, which short-circuits the second switching element SW2, is provided such that the cathode of the diode 72 is located on the power output side, and the anode of the diode 72 is located on the side toward the low-voltage battery. This diode 72 is provided so as to supplement the power supply capacity of the second switching element SW2.

The first switching element SW1 turns on and off at a high speed in response to a pulse signal from the power supply control apparatus 90 such that the second stepped-up voltage V2H, which is a target voltage, is output from the step-up coil 71. In the present embodiment, there are employed two step-up modes; i.e., an asynchronous step-up mode in which the second switching element SW2 is maintained in an off state during step-up operation, and a synchronous step-up mode in which the second switching element SW2 is turned on and off in synchronism with the on-off operation of the first switching element SW1.

Figure 3:
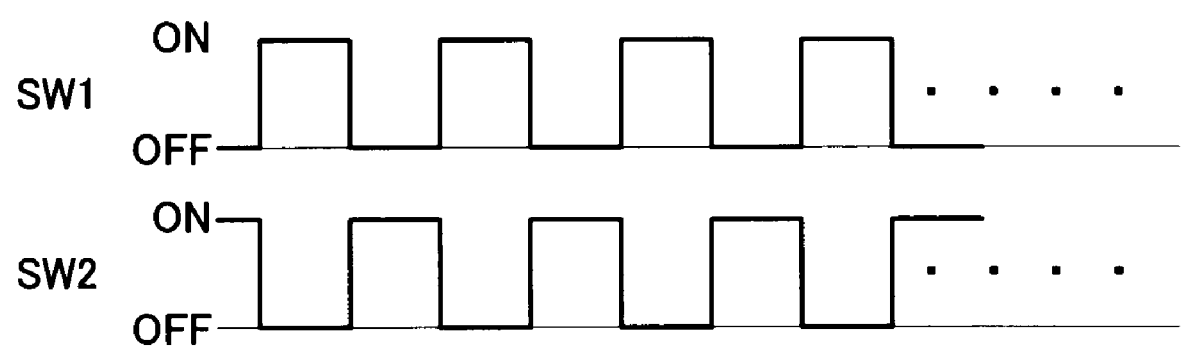
FIG. 3 is an explanatory chart showing control signals which are supplied to first and second switching elements in a synchronous step-up mode.

In the synchronous mode, as shown in FIG. 3, the switching elements SW1 and SW2 are turned on and off at the same period in a mutually related manner. That is, the second switching element SW2 is turned off and the first switching element SW1 is turned on so as to supply current to the step-up coil 71 for a short period of time to thereby accumulate electrical power in the step-up coil 71. Subsequently, the first switching element SW1 is turned off and the second switching element SW2 is turned on so as to output the electrical power accumulated in the step-up coil 71.

Notably, the second switching element SW2 is not necessarily required to be turned on when the first switching element SW1 is turned off. These switching elements may be turned on and off in a different manner, so long as they can cooperatively perform the series of operations; i.e., supplying electricity to the step-up coil 71 to generate electrical power and discharging the electrical power to the load side.

The output ends of the respective power supply lines 53 and 63 of the primary power supply circuit 50 and the secondary power supply circuit 60 are connected to an output power line 100 leading to the motor drive circuit 32. A capacitor 101 for removing power supply noise is provided in the output power line 100 of the power supply apparatus 40.

The auxiliary power supply circuit 80 supplies auxiliary power of a low voltage (12 V) to the assist control apparatus 30 and the secondary power supply line 63. The auxiliary power supply circuit 80 includes a step-down circuit 81 for converting the voltage of the high-voltage battery 51 to the low voltage.

The power supply control apparatus 90, whose main portion is composed of a microcomputer, monitors the voltage (output voltage Vout) of the output power line 100 of the power supply apparatus 40, the voltage VHx of the high-voltage battery 51, and the voltage VLx of the low-voltage battery 61; and controls the on-off operations of the switching elements SW1, SW2, and SW3 in accordance with the monitored voltages. Notably, although not shown, the power supply control apparatus 90 receives electrical power from the low-voltage battery 61 via a regulator.

The power supply control apparatus 90 and the step-up circuit 70 constitute the step-up circuit of the present invention.

Next, there will be described processing for controlling supply of electrical power to the electric motor 15, which processing is performed by the power supply control apparatus 90.

Figure 4:
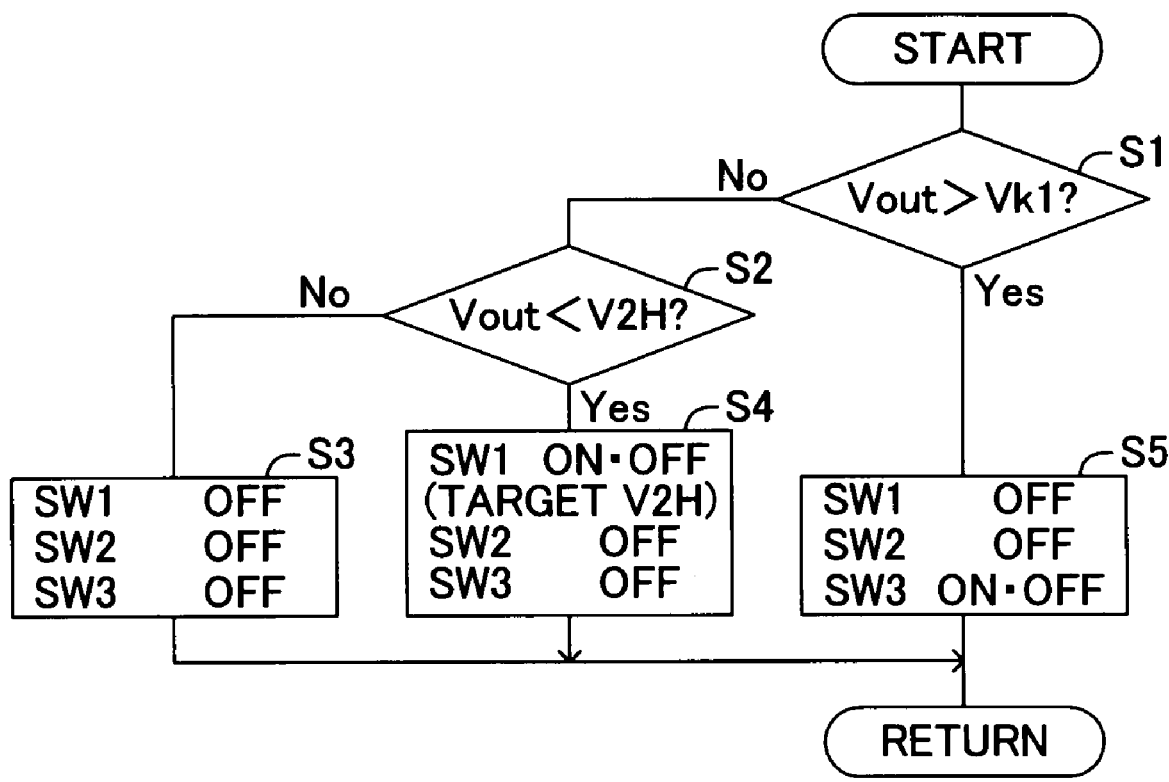
FIG. 4 is a flowchart showing a power supply control routine according to a first embodiment.

FIG. 4 shows a power supply control routine according to a first embodiment. The power supply control routine is stored in ROM of the power supply control apparatus 90 in the form of a control program, and is repeatedly executed at short intervals.

The power supply control routine is started after the relays 54 and 64 are turned on as a result of an unillustrated ignition switch being turned on.

First, in step S1, the output voltage Vout is detected, and a determination is made as to whether or not the detected voltage is higher than a regeneration determination voltage VK1 (e.g., 50 V). This determination processing is performed so as to determine whether or not regenerative power is generated from the electric motor 15. The regeneration determination voltage VK1 is set such that when regenerative power is generated, the output voltage Vout exceeds the regeneration determination voltage VK1.

When regenerative power is not generated (S1: No), in step S2 subsequent to step S1, a determination is made as to whether or not the output voltage Vout is lower than the rated output voltage V2H (target voltage: 33 V) of the secondary power supply circuit 60 (S2). When the primary power supply circuit 50 operates normally, the output voltage Vout is equal to the rated output voltage V1L (48 V) of the primary power supply circuit 50, and therefore, a "No" determination is made. In this case, since electrical power is normally supplied from the primary power supply circuit 50 to the motor drive circuit 32, supply of electrical power from the secondary power supply circuit 60 is unnecessary. Therefore, the first switching element SW1 and the second switching element SW2 are both turned off (S3). Accordingly, the step-up operation of the step-up circuit 70 is not performed. Further, since the second switching element SW2 is turned off, the output of the primary power supply circuit 50 is prevented from flowing into the secondary power supply circuit 60.

Meanwhile, when a "Yes" determination is made in step S2; i.e., when the output voltage Vout becomes lower than V2H (target voltage: 33 V), the first switching element SW1 is caused to perform on-off operation to thereby step up the voltage of the low-voltage battery 61 by means of the step-up coil 71 (S4). In this case, in the secondary power supply circuit 60, step-up operation is performed with the target step-up voltage being set to V2H. That is, the ratio of pulse supply time (duty ratio) of the first switching element SW1 is controlled such that the output voltage Vout becomes the target voltage V2H (33 V). Here, the greater the difference between the detected output voltage Vout and the target voltage V2H, the greater the set duty ratio. Accordingly, the electrical power supplied from the secondary power supply circuit 60 is automatically used as the output of the power supply apparatus 40.

Thus, when the output voltage of the primary power supply circuit 50 has dropped, electrical power supplied from the secondary power supply circuit 60 is used. When the output voltage of the primary power supply circuit 50 increases after that and exceeds the output voltage of the secondary power supply circuit 60, electrical power supplied from the primary power supply circuit 50 is used again.

In this manner, electrical power is automatically supplied to the motor drive circuit 32 from the primary power supply circuit 50 or the secondary power supply circuit 60, whichever is higher in output voltage.

When the electric motor 15 generates regenerative force in the middle of repeated performance of the power supply changeover control, and the voltage exceeds the regeneration determination voltage VK1, a "Yes" determination is made in step S1, and the absorbing switching element SW3 is turned on and off (S5). In this case, the duty ratio of the absorbing switching element SW3 is adjusted in accordance with the detected output voltage Vout. That is, the higher the output voltage Vout, the higher the set duty ratio of the absorbing switching element SW3. Notably, at that time, the switching elements SW1 and SW2 are maintained off.

Accordingly, the regenerative power from the electric motor 15 flows into the regeneration-absorbing circuit 56 of the primary power supply circuit 50, and absorbed to the ground via the absorbing switching element SW3.

Accordingly, the step-down circuit 55 can be protected.

As described above, according to the power supply control routine of the first embodiment, electrical power from the primary power supply circuit 50 is preferentially used, and when the output voltage of the primary power supply circuit 50 drops due to, for example, deterioration of the high-voltage battery 51 and becomes equal to or lower than the rated output voltage of the secondary power supply circuit 60, electrical power is automatically supplied from the secondary power supply circuit 60 to the motor drive circuit 32.

Accordingly, in an ordinary state, a sufficiently large steering assist force can be produced through drive of the electric motor 15 at high voltage; and when the output voltage of the primary power supply circuit 50 drops, the electric motor 15 is driven by use of the low-voltage battery 61, which is shared by other electrical loads. Therefore, provision of a special battery serving as a backup is not required. In addition, since electrical power is supplied from the low-voltage battery to the motor drive circuit 32 while its voltage is stepped up, even at the time of the power supply backup, a large steering assist force can be produced.

In addition, the primary power supply circuit 50 or the secondary power supply circuit 60, whichever is higher in output voltage, is automatically selected. Therefore, a changeover apparatus, such as a changeover switch, becomes unnecessary, and cost does not increase.

Notably, in the power supply control routine of the first embodiment, the second switching element SW2 is maintained off at all times. Therefore, the step-up circuit may be configured such that the diode 72 is solely used without use of the second switching element SW2.

Next, there will be described a power supply control routine according to a second embodiment, which processing is performed by the power supply control apparatus 90. The control routine of this second embodiment differs from the control routine of the first embodiment in terms of the processing for absorbing regenerative power. The hardware configuration is the same as shown in FIGS. 1 and 2.

Figure 5:
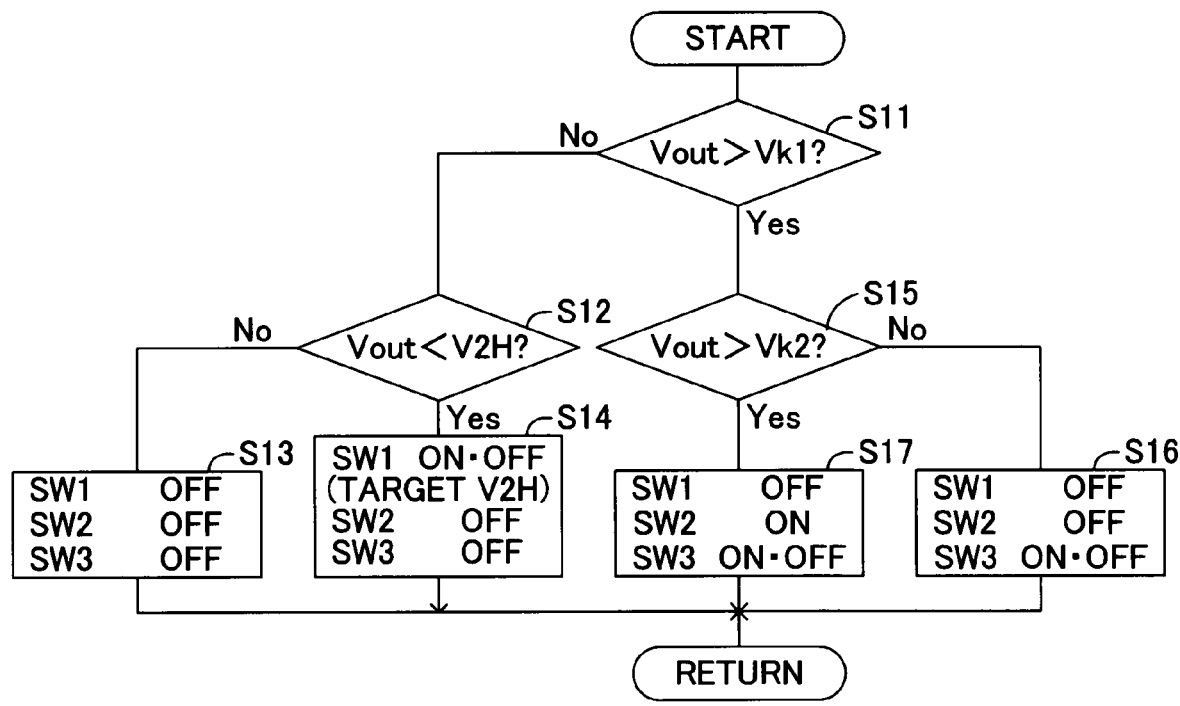
FIG. 5 is a flowchart showing a power supply control routine according to a second embodiment.

FIG. 5 shows the power supply control routine according to the second embodiment. The power supply control routine is stored in the ROM of the power supply control apparatus 90 in the form of a control program, and is repeatedly executed at short intervals.

Since the processing of step S11 to S14 is identical with the processing of step S1 to S4 of the first embodiment shown in FIG. 4, only a simplified description of the processing of step S11 to S14 will be provided.

When in step S11 the detected output voltage Vout is not higher a regeneration determination voltage VK1 (e.g., 50 V), the power supply control apparatus 90 determines that regenerative power is not generated, and proceeds to step S12 so as to determine whether or not the output voltage Vout is lower than the rated output voltage V2H (target voltage: 33 V) of the secondary power supply circuit 60. When the primary power supply circuit 50 operates normally, a "No" determination is made. In this case, since supply of electrical power from the secondary power supply circuit 60 is unnecessary, the first switching element SW1 and the second switching element SW2 are both turned off in step S13, so that the step-up operation is not performed. Further, the absorbing switching element SW3 of the primary power supply circuit 50 is also turned off.

Meanwhile, when a "Yes" determination is made in step S12; i.e., when the output voltage Vout becomes lower than V2H (target voltage: 33 V), the first switching element SW1 is caused to perform on-off operation to thereby step up the voltage of the low-voltage battery 61 by means of the step-up coil 71 (S14), and the stepped-up voltage is supplied from the secondary power supply circuit 60 to the motor drive circuit 32.

When the electric motor 15 generates regenerative force in the middle of repeated performance of the power supply changeover control, and the output voltage Vout exceeds the regeneration determination voltage VK1, a "Yes" determination is made in step S11, and the determination processing of step S15 is performed. In this step S15, a determination is made as to whether or not the output voltage Vout is higher than an absorbing assist determination voltage VK2 (VK2>VK1: e.g., VK2=55 V).

When the output voltage Vout is equal to or lower than the absorbing assist determination voltage VK2, the absorbing switching element SW3 is turned on and off so as to release the regenerative power to the ground (S16). In this case, in the secondary power supply circuit 60, the first and second switching elements SW1 and SW2 are maintained off, so that the step-up operation is not performed.

Meanwhile, when it is determined in step S15 that the output voltage Vout is higher than the absorbing assist determination voltage VK2, the regeneration-absorbing circuit 56 may have failed (e.g., the absorbing switching element SW3 may have failed). Therefore, an on signal is output not only to the switching element SW3 but also to the switching element SW2 such that the secondary power supply circuit 60 absorbs the regenerative power (S17). In this case, even if the regeneration-absorbing circuit 56 of the primary power supply circuit 50 has suffered a wire-breakage failure or a failure of the absorbing switching element SW3, through the turning on of the second switching element SW2, the secondary power supply line 63 of the secondary power supply circuit 60 is closed, whereby the regenerative power is caused to flow to the low-voltage battery 61 for collection thereof.

As described above, in addition to achieving the effects of the first embodiment, the power supply control routine of the second embodiment can cause the secondary power supply circuit 60 to absorb regenerative power even when the regeneration-absorbing circuit 56 of the primary power supply circuit 50 suffers a failure, to thereby prevent a circuit failure of the power supply apparatus 40; for example, a failure of the step-down circuit 55.

Next, there will be described a power supply control routine according to a third embodiment, which processing is performed by the power supply control apparatus 90.

Figure 6:
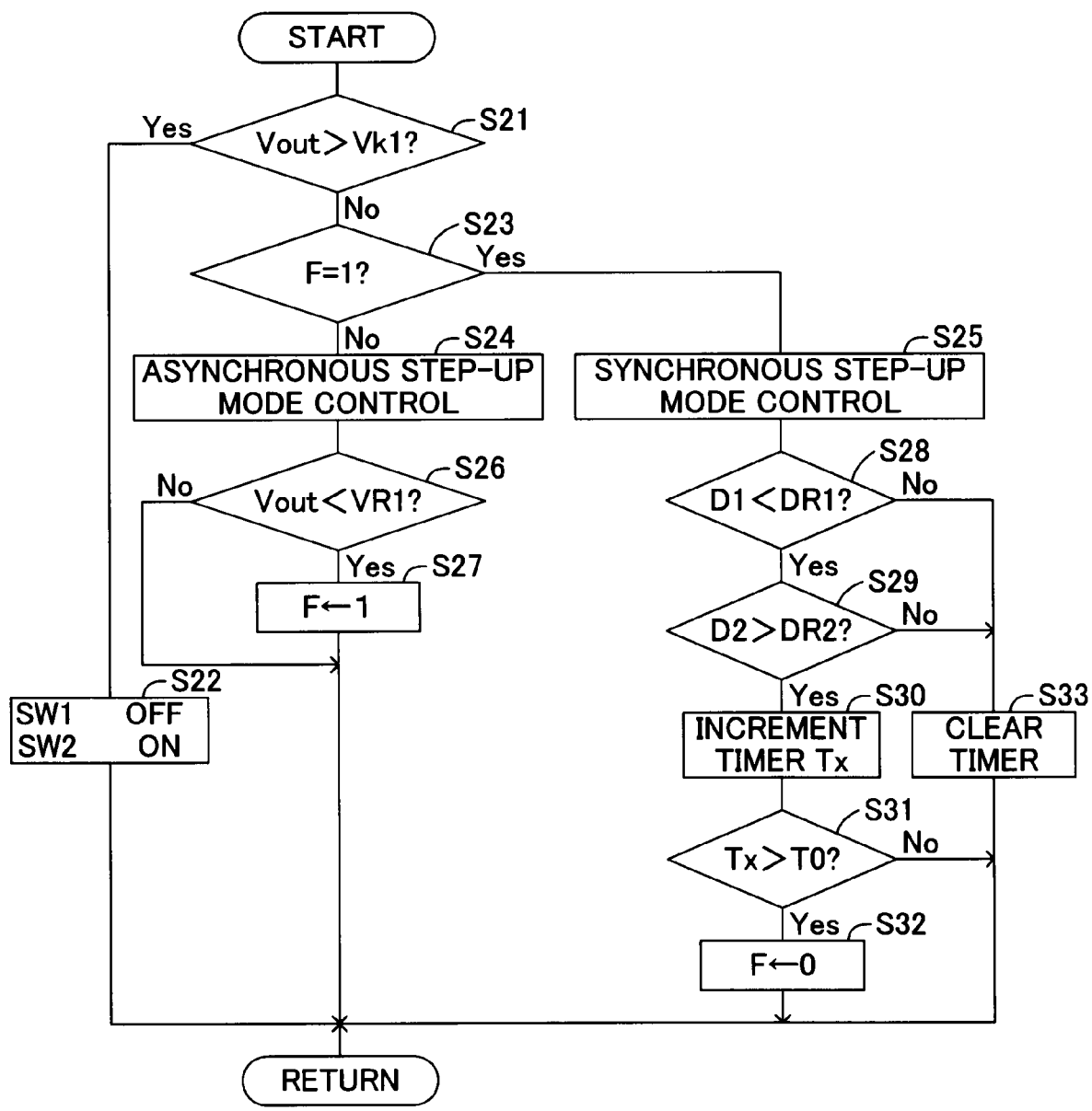
FIG. 6 is a flowchart showing a power supply control routine according to a third embodiment.

FIG. 6 shows the power supply control routine according to the third embodiment. The power supply control routine is stored in the ROM of the power supply control apparatus 90 in the form of a control program, and is repeatedly executed at short intervals.

The present power supply control routine is started after the relays 54 and 64 are turned on as a result of the unillustrated ignition switch being turned on.

When the present power supply control routine is started, in step S21, the output voltage Vout is first detected, and a determination is made as to whether or not the detected voltage is higher than a regeneration determination voltage VK1 (e.g., 50 V). When the detected voltage is higher than the regeneration determination voltage VK1, the power supply control apparatus 90 determines that the electric motor 15 is generating regenerative power, and turns the second switching element SW2 on to thereby cause the regenerative power to flow to the low-voltage battery 61 for collection thereof (S22).

Meanwhile, when the power supply control apparatus 90 has made a "No" determination in step S21; i.e., has determined that electric motor 15 is not generating regenerative power, the power supply control apparatus 90 checks a flag F, which represents that control is being performed in a synchronous step-up mode (S23). When the value of F is 1, synchronous step-up mode control is performed (S25). When the value of F is not 1, asynchronous step-up mode control is performed (S24). Here, the synchronous step-up mode control and the asynchronous step-up mode control will be described.

In the present control routine, irrespective of whether the synchronous step-up mode control or the asynchronous step-up mode control is performed, the output voltage Vout is monitored at all times, and when the output voltage Vout is lower than a reference voltage (in this example, the target voltage V2H of the secondary power supply circuit), the duty ratio of the first switching element SW1 is adjusted by turning the first switching element SW1 on and off at predetermined intervals such that the output voltage Vout of the step-up circuit 70 becomes equal to the target voltage V2H. That is, PWM control is performed to increase the duty ratio with the difference between the output voltage Vout and the target voltage V2H.

During the synchronous step-up mode control, the second switching element SW2 is turned on and off in synchronism with the first switching element SW1.

For example, as shown in FIG. 3, the second switching element SW2 is turned off and the first switching element SW1 is turned on so as to supply current to the step-up coil 71 for a short period of time to thereby accumulate electrical power in the step-up coil 71. Subsequently, the first switching element SW1 is turned off and the second switching element SW2 is turned on so as to output the electrical power accumulated in the step-up coil 71. In this manner, the step-up coil 71 performs the step-up operation through the synchronized on off operations of the two switching elements SW1 and SW2.

Meanwhile, during the asynchronous step-up mode control, the second switching element SW2 is turned off. In this case as well, the second switching element SW2 can supply electricity only to the output side (to the motor drive circuit), because the second switching element SW2 functions as a parasitic diode. Therefore, by turning the first switching element SW1 on and off, electrical power supplied from the low-voltage battery and having a stepped-up voltage can be output. Further, flow of electrical power from the primary power supply circuit 50 to the secondary power supply circuit 60 can be prevented at all times.

In the step-up controls of the two modes, the output voltage Vout is monitored at all times, and when the output voltage Vout is lower than the target voltage V2H, the step-up operation is substantially not performed, and the first switching element SW1 is maintained in an off state.

At the startup of the present control routine, the flag F is set to 0. Therefore, a "NO" determination is made in step S23, and the asynchronous step-up mode control is selected in step S24. Subsequently, a determination is made as to whether the output voltage Vout of the primary power supply circuit 50 is lower than a reference voltage VR1 (in this example, 30 V) (S26). When the output voltage Vout is not lower than the reference voltage, the current execution of the present routine is ended. When the output voltage Vout of the primary power supply circuit 50 decreases and becomes lower than VR1 in the course of repeated execution of the present routine, the flag F is set to 1, and the current execution of the present routine is ended (S27).

When the flag F is set to 1 in step S27, a "Yes" determination is made in step S23 during the next execution of the present routine, and the asynchronous step-up mode control is switched to the synchronous step-up mode control (S25). In this synchronous step-up mode control, the second switching element SW2 is turned on and off in synchronism with the first switching element SW1. In this case, when the output voltage Vout is lower than the target voltage V2H of the secondary power supply circuit 60, the duty ratios of the switching elements SW1 and SW2 are adjusted by turning the switching elements SW1 and SW2 on and off such that the output voltage Vout of the step-up circuit 70 becomes equal to the target voltage V2H.

In this synchronous step-up mode control, in order to prevent electrical power of the primary power supply circuit 50 from continuing to flow into the secondary power supply circuit 60, which would otherwise occur as a result of the output voltage of the primary power supply circuit 50 returning to the original level, the return of the output voltage of the primary power supply circuit 50 is determined as follows.

First, determinations are made as to whether the duty ratio D1 of the first switching element SW1 is smaller than a reference duty ratio DR1 and whether the duty ratio D2 of the second switching element SW2 is greater than a reference duty ratio DR2. During the synchronous step-up mode control, the duty ratios of the first and second switching elements SW1 and SW2 are controlled such that the output voltage Vout becomes equal to the target voltage V2H. However, when the output voltage of the primary power supply circuit 50 returns to the original level, the duty ratio of the first switching element SW1 becomes lower, because the time over which electricity is supplied to the step-up coil 71 becomes shorter.

Meanwhile, the duty ratio of the second switching element SW2 increases for the following reason. When the output voltage Vout becomes excessively higher than the target voltage V2H due to the step-up control, the duty ratio of the second switching element SW2 is increased so as to return to the secondary power supply circuit the electrical power of the step-up voltage.

When a "Yes" determination is made in both steps S28 and S29, it can be determined that the output voltage of the primary power supply circuit 50 returns and becomes higher than the target voltage V2 of the step-up circuit 70, or the electric motor 15 generates regenerative power. Since the generation of regenerative power by the electric motor 15 is temporary, the regenerative power is absorbed by the low-voltage battery 16. For such operation, in the following steps, the synchronous step-up mode is continued for a time required to absorb the regenerative power, and then switched to the asynchronous step-up mode.

That is, a timer for time measurement is incremented in step S30, and a determination is made as to whether or not the timer value Tx has exceeded a reference time T0 (S31). When the duty ratio conditions of steps S28 and S29 are satisfied continuously over the reference time T0 (S31: Yes), the output voltage of the primary power supply circuit 50 is determined to have returned to the target voltage of the step-up circuit 70 or to a higher level. In this case, the flag F is set to 0, and the current execution of the present control routine is ended (S32). Accordingly, the control mode is switched from the synchronous step-up mode to the asynchronous step-up mode.

Meanwhile, when a "No" determination is made in either of steps S28 and S29, the timer value Tx is cleared to zero, and the current execution of the present control routine is ended (S33). Accordingly, the synchronous step-up mode is continued.

According to the above-described power supply control routine, when the output voltage of the primary power supply circuit 50 is normal, the secondary power supply circuit performs the step-up control in the asynchronous step-up mode. Therefore, flow of electrical power from the primary power supply circuit 50 into the secondary power supply circuit 60 is prevented. When the output voltage of the primary power supply circuit 50 drops, the secondary power supply circuit 60 performs the step-up control in the synchronous step-up mode. In this case, since step-up is performed by turning the second switching element SW2 on and off in synchronism with the first switching element SW1, the control of stepping up to the target voltage is performed well, and stable stepped-up voltage can be obtained.

Further, when the output voltage of the primary power supply circuit 50 returns and becomes higher than the target voltage of the secondary power supply circuit 60 during performance of the step-up control in the synchronous step-up mode, the control mode is switched to the asynchronous mode, whereby flow of electrical power from the primary power supply circuit 50 into the secondary power supply circuit 60 is prevented. Accordingly, the batteries 51 and 61 and circuits can be protected.

Further, when regenerative power is generated at the electric motor 15, the regenerative power can be absorbed by the low-voltage battery 61 via the secondary power supply circuit 60.

Needless to say, the effects attained by the first and second embodiments can be attained.

Notably, in the present embodiment, the return of the output voltage of the primary power supply circuit 50 (flow of electrical power into the secondary power supply circuit 60) is determined in steps S28 and S29 on the basis of the duty ratios D1 and D2 of the first and second switching elements SW1 and SW2. However, such determination may be performed on the basis of the duty ratio D1 of the first switching element SW1 only.

Figure 7:
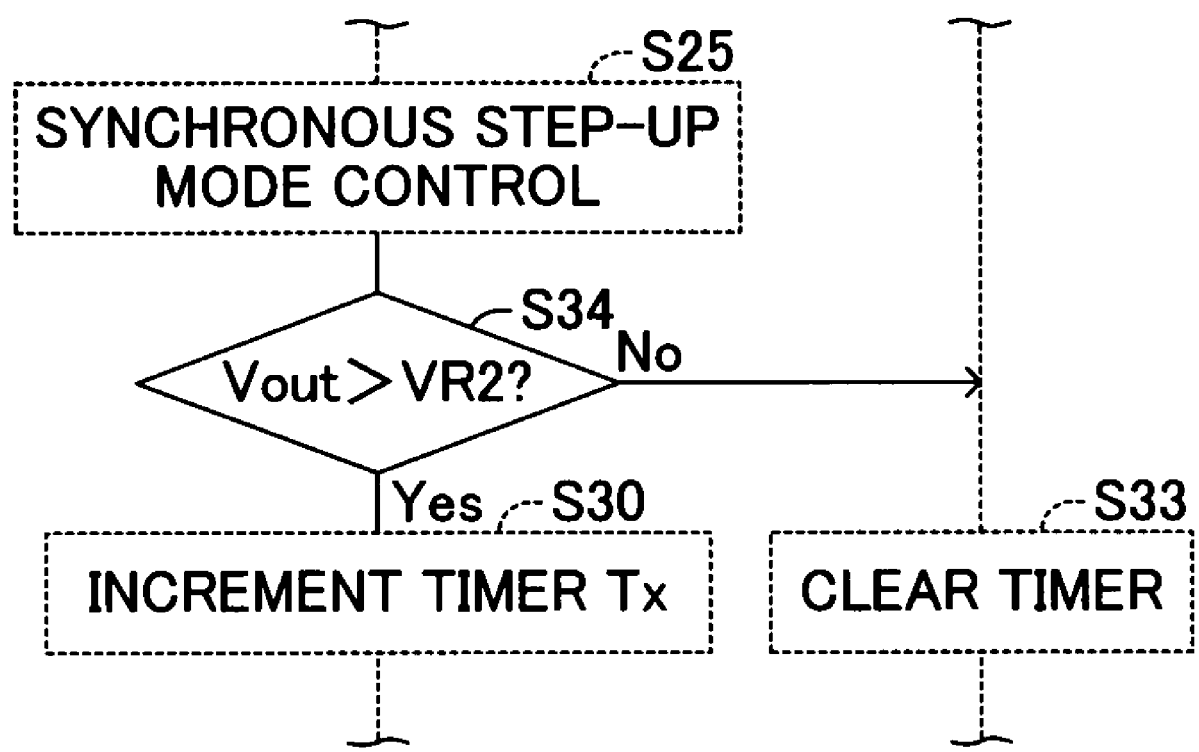
FIG. 7 is a flowchart showing a modification of the power supply control routine according to the third embodiment.

Further, in place of the processing of steps S28 and S29, the processing shown in FIG. 7 may be performed. That is, when the output voltage Vout of the power supply apparatus 40 becomes higher than a predetermined voltage VR2 (S34), it is determined that the output voltage of the primary power supply circuit 50 has returned or the electric motor 15 has generated regenerative power, and then timer count operation of step S30 is started. For example, the predetermined voltage VR2 is set to the target step-up voltage of the step-up circuit 70 or a predetermined voltage slightly greater than the target step-up voltage.

Next, there will be described a power supply control routine according to a fourth embodiment, which processing is performed by the power supply control apparatus 90.

Figure 8:
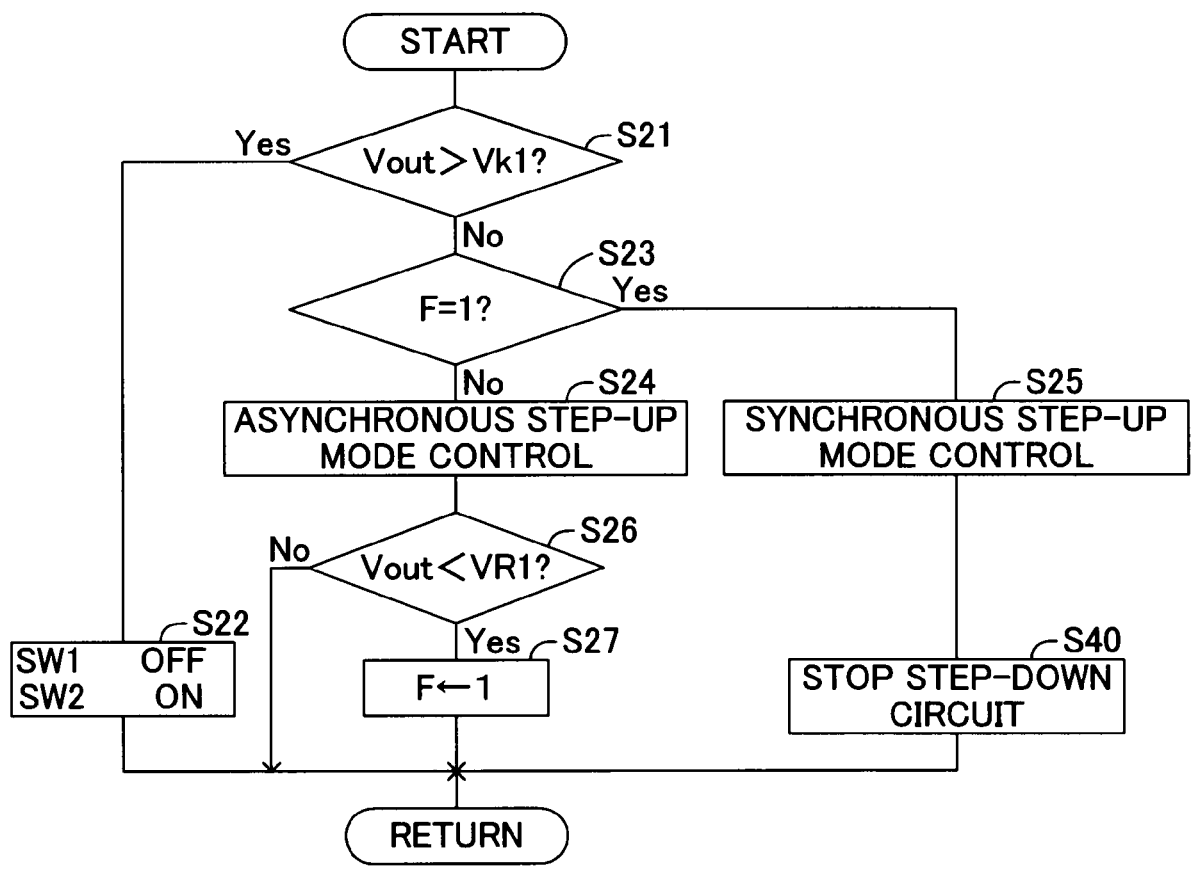
FIG. 8 is a flowchart showing a power supply control routine according to a fourth embodiment.

FIG. 8 shows the power supply control routine according to the fourth embodiment. The power supply control routine is stored in the ROM of the power supply control apparatus 90 in the form of a control program, and is repeatedly executed at short intervals.

In the present power supply control routine, instead of the processing of steps S28 to S33 of the control routine of the third embodiment, the processing of step S40 is performed. Since the processing operations of the remaining steps are identical with those of the third embodiment, the remaining steps are denoted by the same step numbers, and their repeated descriptions are omitted.

When the output voltage Vout has dropped and the step-up control in the synchronous step-up mode has started (S25), the processing of step S40 is performed. In the processing of step S40, an operation stop instruction is output to the step-down circuit 55. Accordingly, after this point in time, no electrical power is supplied from the step-down circuit 55 to the electric motor 15, and electrical power is supplied from the secondary power supply circuit 60. In this case, regenerative power generated at the electric motor 15 does not flow to the step-down circuit 55, but flows to the secondary power supply circuit 60 and is absorbed there. Therefore, the step-down circuit 55 can be protected. Further, even when the voltage of the high-voltage battery 51 returns after that, the electrical power of the high-voltage battery 51 does not flow to the low-voltage battery 61.

Next, there will be described a charging control which the power supply control apparatus 90 performs when the low-voltage battery 61 deteriorates and its output voltage becomes lower than a predetermined voltage.

Figure 9:
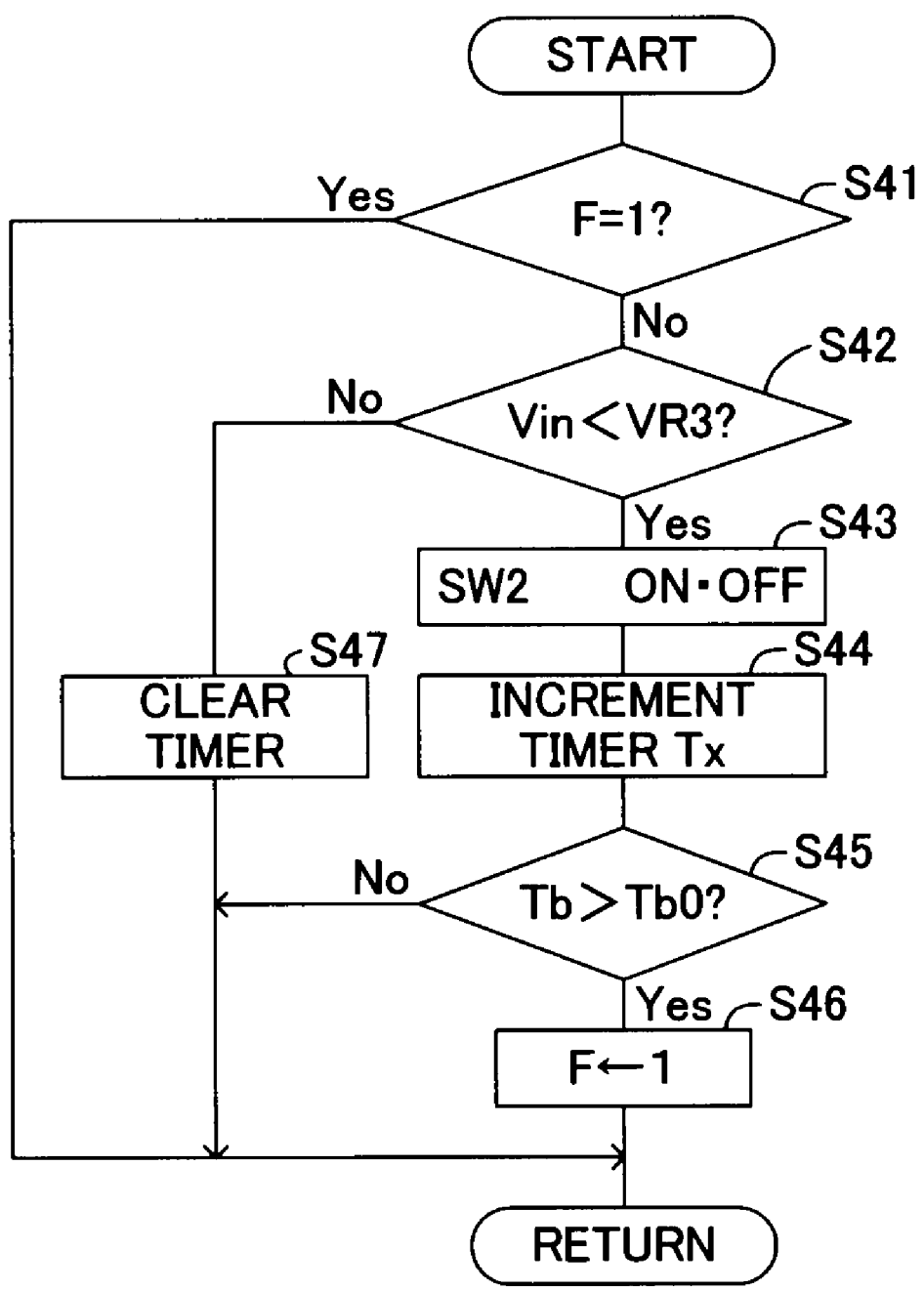
FIG. 9 is a flowchart showing a low-voltage battery charging control routine.

FIG. 9 shows the low-voltage battery charging control routine, which is stored in the ROM of the power supply control apparatus 90 in the form of a control program, and is repeatedly executed at short intervals, in parallel with any one of the above-described power supply control routines.

When the present control routine is started as a result of the unillustrated ignition switch being turned on, the state of a flag F is checked (S41). This flag F, which is set to 1 when operation of charging the low-voltage battery 61 is prohibited, is set to 0 at the time of startup of the present control routine.

Accordingly, after proceeding to step S42, the power supply control apparatus 90 reads low-voltage battery voltage Vin (input voltage of the step-up circuit 70), and determines whether or not the battery voltage Vin is lower than a previously set charging reference voltage VR3 (e.g., 11 V). In a case where the low-voltage battery has deteriorated and the battery voltage Vin has become lower than the charging reference voltage VR3, the power supply control apparatus 90 turns the second switching element SW2 of the step-up circuit 70 on and off so as to feed the output power of the primary power supply circuit 50 to the low-voltage battery 61 via the secondary power supply circuit 60 and charge the same (S43). In this case, PWM control is performed for the second switching element SW2, while the charging voltage is set to a predetermined voltage (e.g., 13 V).

A timer for measuring the charging time is then incremented (S44). Subsequently, a determination is made as to whether the timer value Tb has exceeded a charging reference time Tb0 (S45). When the timer value Tb has not yet exceeded the charging reference time Tb0, the current execution of the present routine is ended.

When the charging time has reached the charging reference time Tb0 after charging of the low-voltage battery 61 had been started (S45: Yes), the flag F is set to 1 (S46). Accordingly, after this point in time, charging of the low-voltage battery 61 is prohibited. Further, when the battery voltage Vin has become equal to or higher than the charging reference voltage VR3 during charging of the low-voltage battery 61, the timer value Tx is cleared to zero (S47).

According to this low-voltage battery charging control routine, through control of the second switching element SW2 of the step-up circuit 70, electrical power of the high-voltage battery 51 can be charged into the low-voltage battery 61 via the secondary power supply circuit 60. Further, through charging voltage control and/or restriction of charging time, the step-up circuit 70 and the step-down circuit 55 can be protected against overcurrent.

Next, processing for assist control; i.e., control of the electric motor 15, will be described.

Figure 10:
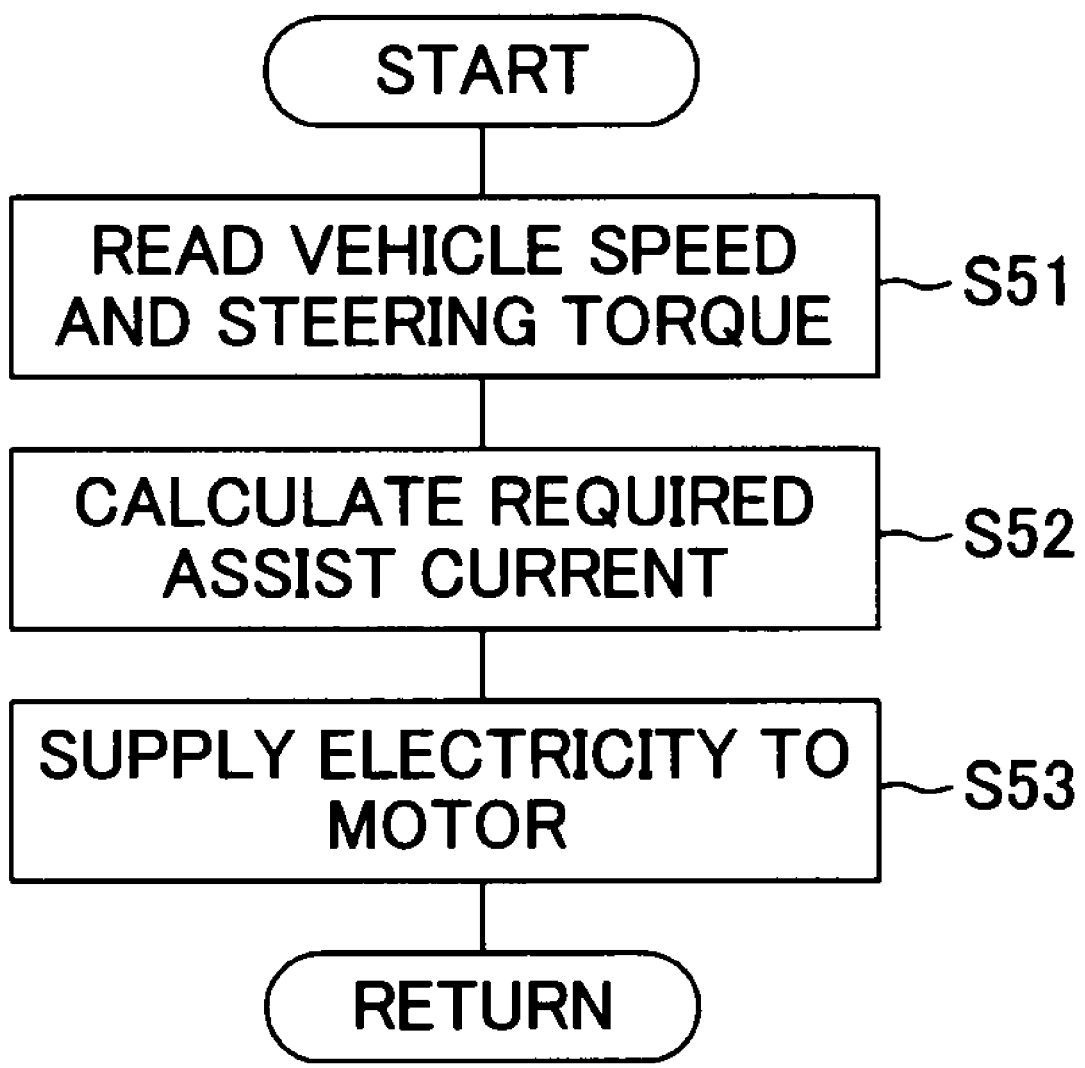
FIG. 10 is a flowchart showing an assist control routine.

FIG. 10 shows an assist control routine executed by the electronic control apparatus for assist control 31. This assist control routine is stored in ROM of the electronic control apparatus for assist control 31 in the form of a control program, and is repeatedly executed at short intervals.

Figure 11:
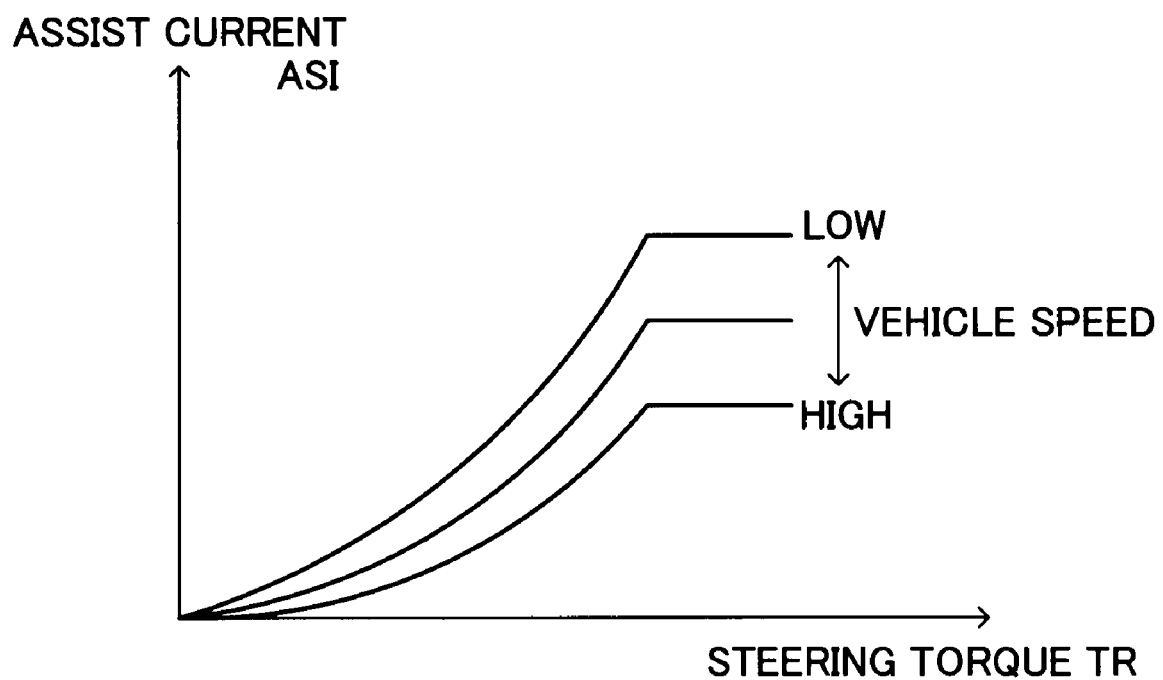
FIG. 11 is an explanatory diagram showing an assist current table.

First, in step S51, the electronic control apparatus for assist control 31 first reads the vehicle speed V detected by means of the vehicle speed sensor 28, and the steering torque TR, which is calculated from the difference between rotational angles detected by means of the resolvers 22 and 23 of the steering torque sensor 20. Subsequently, the electronic control apparatus for assist control 31 calculates a required assist current ASI corresponding to the vehicle speed V and the steering torque TR, by reference to an assist current table shown in FIG. 11 (S52). The assist current table is stored in the ROM of the electronic control apparatus for assist control 31, and is set such that the required assist current ASI increases with the steering torque TR and assumes a larger value as the vehicle speed V decreases, as shown in FIG. 11.

Next, the electronic control apparatus for assist control 31 controls the motor drive circuit 32 (inverter circuit) in accordance with the calculated required assist current ASI (S53). For example, the electronic control apparatus for assist control 31 generates a three-phase pulse train signal having a pulse width approximately proportional to the magnitude of the required assist current ASI, and supplies the signal to a switch circuit (not shown) of the inverter, whereby the required assist current ASI is supplied to the electric motor 15 as drive current so as to generate a predetermined assist torque.

The electronic power steering apparatus of the present mode has been described; however, the present invention is not limited to the above-described mode, and may be modified without departing from the object of the present invention.

For example, the power supply controls of the first to fourth embodiments may be modified such that when the voltage of the high-voltage battery 51 drops, operation of the step-down circuit 55 is stopped, and power is supplied from the secondary power supply circuit 60.

That is, processing as shown in FIG. 12 may be performed. The voltage VHin of the high-voltage battery 51 is monitored, and a determination is made as to whether or not the battery voltage VHin is higher than a preset reference voltage VHR (e.g., 200 V) (S61). When the battery voltage VHin is not higher than the reference voltage VHR, operation of the step-down circuit 55 is stopped (S62), and when the battery voltage VHin is higher than the reference voltage VHR, the step-down circuit 55 is operated (S63).

Further, in the above-described mode, the diode 72 is provided in the step-up circuit 70 so as to bypass the second switching element SW2. However, the diode 72 may be omitted. Further, in a case where absorption of regenerative power by the secondary power supply circuit 60 is not performed, the second switching element SW2 may be omitted so that only the diode 72 is provided.

Further, when the output voltage of the primary power supply circuit 50 drops and the secondary power supply circuit 60 supplies electrical power, an unillustrated alarm (e.g., a lamp or buzzer) may be operated so as to prompt an operator to change the battery.

The voltage values (battery voltage, step-down voltage, step-up voltage, reference voltage, etc.) in the above-described embodiments can be set arbitrarily.

The invention claimed is:

1. An electric power steering apparatus, comprising:
    an electric motor supplied with power from a power supply apparatus; and
    motor control means for controlling operation of the electric motor according to a steering state of a steering wheel to apply a steering force to steerable wheels,
    wherein the power supply apparatus comprises at least two power supply circuits, including
    a primary power supply circuit which includes a high-voltage battery to supply electrical power of a first voltage and a step-down circuit to step down the voltage of the high-voltage battery and which supplies the electrical power of the high-voltage battery having a stepped down voltage, and
    a secondary power supply circuit which includes a low-voltage battery to supply electrical power of a second voltage lower than the first voltage and a step-up circuit to step up the voltage of the low-voltage battery and which supplies the electrical power of the low-voltage battery having a stepped up voltage, and
    the primary power supply circuit and the secondary power supply circuit are connected in parallel, and the stepped up voltage output from the secondary power supply circuit is set to be lower than the stepped down voltage output from the primary power supply circuit.

2. An electric power steering apparatus according to claim 1, further comprising:
    output-voltage monitor means for monitoring output voltage of the power supply apparatus; and
    step-up control means, operable when the monitored output voltage is determined to have become lower than a predetermined voltage, for starting step-up operation of the step-up circuit of the secondary power supply circuit.

3. An electric power steering apparatus according to claim 1, wherein main regeneration-absorbing means for absorbing regenerative power generated by the electric motor is provided on the output side of the step-down circuit of the primary power supply circuit.

4. An electric power steering apparatus according to claim 3, further comprising switching means, operable when a voltage of the regenerative power absorbed by the main regeneration-absorbing means exceeds a reference voltage, for closing a power supply line of the secondary power supply circuit so as to cause the regenerative power to flow into the secondary power supply circuit so that the regenerative power is absorbed by the secondary power supply circuit.

5. An electric power steering apparatus according to claim 1, further comprising low-voltage-battery voltage detection means for detecting a voltage drop of the low-voltage battery, wherein when the voltage drop of the low-voltage battery is detected, electrical power of the high-voltage battery is charged into the low-voltage battery via the primary power supply circuit.

6. The electric power steering apparatus according to claim 3, wherein the main regeneration-absorbing means includes a resistor connected in series between the output side of the step-down circuit of the primary power supply circuit and a third switch, the third switch being connected to ground to absorb the regenerative power.

7. The electric power steering apparatus according to claim 1, further comprising:
    a steering column operatively coupled to the steering wheel;
    a torsion coupled to the steering column via a first resolver, the first resolver detecting a rotation angle of an upper end of the torsion bar;
    a second resolver coupled to a lower end of the torsion bar, the second resolver detecting a rotation angle of the lower end of the torsion bar, the steering state of the steering wheel being determined based on the rotation angle of the upper end of the torsion bar and the rotation angle of the lower end of the torsion bar.

8. The electric power steering apparatus according to claim 7, further comprising:
    a speed sensor to determine vehicle speed, the operation of the electric motor being controlled based on the vehicle speed determined.

9. The electric power steering apparatus according to claim 1, wherein the electric motor is a three phase brushless motor.

10. The electric power steering apparatus according to claim 9, further comprising:
    an inverter to drive the electric motor according to an output of the motor control means.

11. The electric power steering apparatus according to claim 1, wherein the electric motor is a two phase brushless motor, and the electric motor is driven by an H-bridge circuit in accordance with an output of the motor control means.

12. The electric power steering apparatus according to claim 1, further comprising:
an auxiliary power supply connected to the high-voltage battery to supply power to the motor control means.

13. An electric power steering apparatus including an electric motor supplied with power from a power supply apparatus, and motor control means for controlling operation of the electric motor, wherein the electric motor is operated in accordance with a steering state of a steering wheel so as to apply a steering force to steerable wheels, wherein the power supply apparatus comprises at least two power supply circuits, including
a primary power supply circuit which includes a high-voltage battery for supplying electrical power of a first voltage and a step-down circuit for stepping down the voltage of the high-voltage battery and which supplies the electrical power of the high-voltage battery having a stepped down voltage,
a secondary power supply circuit which includes a low-voltage battery for supplying electrical power of a second voltage lower than the first voltage and a step-up circuit for stepping up the voltage of the low-voltage battery and which supplies the electrical power of the low-voltage battery having a stepped up voltage, the primary power supply circuit and the secondary power supply circuit being connected in parallel, the stepped up voltage output from the secondary power supply circuit being set to be lower than the stepped down voltage output from the primary power supply circuit,
the step-up circuit includes a step-up coil provided in series in a secondary power supply line, a first switching element for selectively grounding the step-up coil on a load side, a second switching element functioning as a parasitic diode and provided in series in the secondary power supply line to be located on the load side in relation to a node where the first switching element is connected to the secondary power supply line, switching control means for controlling on-off operations of the first and second switching elements, and voltage monitor means for monitoring the output voltage of the power supply apparatus; and
the switching control means has a synchronous step-up mode for stepping up the output voltage to a target voltage by turning the second switching element on and off in synchronism with the on-off operation of the first switching element, and an asynchronous step-up mode for stepping up the output voltage to a target voltage by turning the first switching element on and off while maintaining the second switching element in an off state, wherein when the output voltage of the power supply apparatus is equal to or greater than a predetermined voltage, the asynchronous step-up mode is selected, and when the output voltage of the power supply apparatus becomes lower than the predetermined voltage, control mode is switched from the asynchronous step-up mode to the synchronous step-up mode.

14. An electric power steering apparatus according to claim 13, wherein when a flow of electrical power to the secondary power supply circuit is detected while the step-up control is performed in the synchronous step-up mode, and the flow continues for a predetermined period of time, the control mode is switched from the synchronous step-up mode to the asynchronous step-up mode.

15. The electric power steering apparatus according to claim 13, wherein the first switching element and the second switching element are field effect transistors.

16. The electric power steering apparatus according to claim 13, wherein, in the synchronous step-up mode, the first switching element is on while the second switching element is off and the first switching element is off while the second switching element is on.

17. The electric power steering apparatus according to claim 16, wherein a duty cycle of the second switching element is set according to a difference between an output of the primary power supply circuit and a predetermined threshold.

18. The electric power steering apparatus according to claim 16, wherein both the first switching element and the second switching element are turned off when the electric motor generates regenerative power.

19. A method of controlling an electric power steering apparatus, comprising:
alternately turning on and off a third switch in a primary power supply circuit to absorb regenerative power when an electric motor of the electric power steering apparatus generates regenerative power;
alternately turning on and off a first switch of a secondary power supply circuit to step up the voltage of the secondary power supply circuit when a voltage output of the primary power supply circuit is below a predetermined threshold; and
turning off the third switch and the first switch when the output voltage of the primary power supply circuit exceeds the predetermined threshold.

20. The method according to claim 19, further comprising:
alternately turning on and off a second switch of the secondary power supply circuit in opposite phase relative to the first switch when the output voltage of the primary power supply is below the predetermined threshold, the first switch and the second switch stepping up the voltage of the secondary power supply circuit.

* * * * *